3,020,290
PREPARATION OF UNSATURATED COMPOUNDS
Philip H. Moss, Austin, Tex., assignor to Jefferson Chemical Company, Inc., Houston, Tex., a corporation of Delaware
No Drawing. Filed Oct. 14, 1959, Ser. No. 846,249
4 Claims. (Cl. 260—340.2)

This invention relates to a novel method of converting alkylene carbonates into new vinylene carbonate compounds, and to the compounds themselves.

More particularly, my invention pertains to dehydrogenation of an alkylene carbonate of the formula

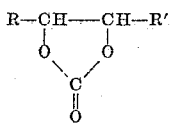

to form the corresponding vinylene carbonate of the formula

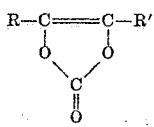

where R is a methyl or ethyl radical and R' is hydrogen or methyl radical. My invention also relates to new vinylene compounds of the formula

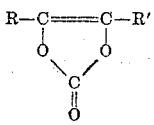

where R and R' are as heretofore defined.

In the past, ethylene carbonate had been dehydrogenated into a vinylene carbonate of the formula

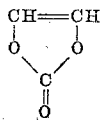

by introducing chlorine into ethylene carbonate at an elevated temperature (e.g. 63–70° C.) in the presence of catalyst to form monochloroethylene carbonate and 1,2-dichloroethylene carbonate. Subsequently, the monochloroethylene carbonate product of the chlorinaion step is reacted with triethylamine in the presence of dry ether solvent to form the above-described vinylene carbonate and triethylamine hydrochloride. This past procedure, although successfully producing the vinyl derivative of ethylene carbonate has the disadvantage from a commercial point of view of requiring the employment of a relatively high cost amine reactant.

I have discovered by contacting chlorine, preferably in the gaseous form, with an alkylene carbonate of 4 to 6 carbon atoms as heretofore defined at a first elevated temperature, desirably between 20 and 90° C., while simultaneously illuminating the reaction mixture with actinic light particularly in the wave length range of from 2000 to 4000 angstroms and then subsequently increasing the temperature of the reaction mixture to a second elevated temperature, desirably between 100 and 300° C., the alkylene carbonate is converted into the corresponding vinylene product without the need for dehydrochlorinating with an amine.

It is theorized that in the treatment of an alkylene carbonate with chlorine in the presence of actinic light at a first elevated temperature as defined herein relatively unstable chloro intermediates are formed which decompose spontaneously into the desired vinylene derivatives with the accompanying evolution of hydrogen chloride when subjected to a second elevated temperature as heretofore defined.

In the novel method preferably between 0.25 and 2 mols of chlorine per mol of alkylene carbonate, more preferably between 0.75 and 1.25 mols of chlorine, should be introduced into the reaction zone.

An effective and strong source of actinic light is a requirement of the process for the production of compounds of this invention. Although sunlight may be used, it is preferred that a light source be employed that is more concentrated in the wave lengths that catalyze the chlorination of the alkylene carbonate. Particularly useful are mercury vapor lamps or sun lamps which emit a substantial amount of light within the region of 2000–4000 angstroms. When a borosilicate glass such as Pyrex is employed as the reaction vessel with an external actinic light source, the most effective wave length of light is above 3000 angstroms since the lower wave lengths tend to be filtered out. Quartz glass is the preferred material for the reaction vessel with an external actinic light source since it does not substantially filter out wave lengths in the 2000–4000 angstrom range.

In order to promote a reasonable rate of reaction, it is desirable to introduce chlorine gas into a liquid medium. Therefore, if the alkylene carbonate reactant is a non-liquid at the temperature of reaction, an inert solvent for the alkylene carbonate such as carbon tetrachloride or trichlorobenzene is desirably employed.

After treatment of the carbonate with chlorine to form the relatively unstable chlorinated intermediates, introduction of the chlorine and illumination with actinic light are ceased and the temperature of reaction is increased, desirably to between 100 and 300° C., to insure decomposition of the unstable chlorinated intermediates into the corresponding vinylene carbonate. This second elevated temperature is preferably maintained until the evolution and escape of the hydrogen chloride gas and excess chlorine gas is substantially completed. During the decomposition stage the reaction mixture can be distilled and subsequently condensed in order to enhance the evolution and escape of hydrogen chloride. To accomplish this substantial distillation at the second elevated temperature, reduced pressure may be employed whenever necessary. Alternatively, if it is desired to maintain the reaction mixture substantially in the l'quid state while permitting the evolution and escape of the hydrogen chloride by-product a reflux condenser and/or superatmospheric pressure may be employed in the standard manner whenever necessary.

The vinylene product is normally separated from the final reaction mixture and purified by fractional distillation.

The reaction steps are generally carried out in apparatus that is resistant to chlorine and hydrogen chloride. Normally, the reaction apparatus is composed of borosilicate glass, quartz or of a metal construction having windows, or other means for the transmission of actinic light into the reaction mixture.

In a preferred procedure, chlorine is bubbled through the alkylene carbonate at a rate of between 0.1 and 1.0 mol chlorine/mol carbonate/hour until the chlorine content of the carbonate indicates the formation of a monochloro product. The reaction mixture is then distilled in its entirety to evolve hydrogen chloride and the distillate is fractionally distilled to recover the vinyl product.

The following example further illustrates my invention:

Example I

Into a vertical Pyrex glass cylinder equipped with a thermowell containing a thermometer, fitted with a water-cooled condenser at the upper end, a fritted glass dispersion disk at the lower end, the lower end being attached to a chlorine gas source, were added 508 grams (4.98 mols) of propylene carbonate. 404 grams (5.62 mols) of chlorine gas were bubbled in 7.3 hours through the propylene carbonate maintained at a temperature of 35–50° C. through the employment of an infrared heat lamp while simultaneously irradiating the propylene carbonate with a Hanovia sun lamp at close range. At the end of the reaction period the reaction mixture weighed 688 grams. The increase in weight corresponded to 5.2 mols of intermediate chloride derivative calculated as the monochloride. The intermediate product was rapidly distilled under reduced pressure through a 12 x 1 inch distillation column packed with stainless steel protruded packing. The distillation was accompanied by the evolution of hydrogen chloride gas. The maximum temperature and minimum pressure attained during this distillation was 164° C. and 24 mm. Hg, respectively. Redistillation of the crude distillate yielded 154.5 grams of a fraction boiling at 69° C. at 17 mm. Hg pressure absolute. This fraction was found to distill without decomposition at 178–180° C. at 750 mm. Hg absolute and had a refractive index of $n(20/D)$ 1.4264. The product was shown by analysis to possess the empirical formula $C_4H_4O_3$ (found: carbon—47.92%, hydrogen—4.12%, oxygen—47.96%; theory: carbon—48.01%, hydrogen—4.03%, oxygen—47.96%). The product was found to be unsaturated by its reaction with bromine water and shown to be a carbonate by its formation of barium carbonate with an aqueous solution of barium hydroxide. An infrared spectrogram showed strong peaks for C=C and $CH_3$ groups and the following structure and nomenclature were assigned:

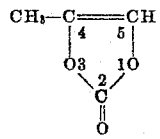

4-methyl-1-3,-dioxolen-2-one

Specific examples of other vinylene carbonates which are prepared by my method are 4-ethyl-1,3-dioxolen-2-one, 4,5 - dimethyl - 1,3 - dioxolen - 2 - one, and 4-ethyl-5-methyl-1,3-dioxolen-2-one.

The novel vinylene carbonates contemplated herein are useful as monomers in preparing copolymers having a reactive functional group through which properties of the product can be altered. More particularly, said carbonates are useful as initial reactants in producing polyhydroxycarbamates which find their use as surface active agents in soluble oils. The surface active polyhydroxycarbamates are prepared by polymerizing a vinylene carbonate of the invention to its corresponding dimer, trimer, or higher polymer and reacting the resultant polymer with ammonia.

Obviously, many modifications and variations of the invention as hereinbefore set forth may be made without departing from the spirit and scope thereof and therefore only such limitations should be imposed as are indicated in the appended claims.

I claim:

1. A process for the preparation of the compound of the formula

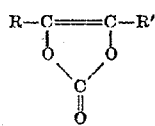

where R is a radical selected from the group consisting of methyl and ethyl and R' is a radical selected from the group consisting of hydrogen and methyl which comprises passing chlorine gas into an alkylene carbonate of the formula

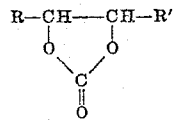

in a mol quantity ratio of said gas to said carbonate of between 1:4 and 2:1, said alkylene carbonate being illuminated with actinic light of a wave length of 2000–4000 angstroms and maintained at a temperature between 20 and 90° C., then subsequently heating the resultant chlorinated reaction mixture to a temperature between 100 and 300° C. until hydrogen chloride substantially ceases to evolve.

2. A method in accordance with claim 1 wherein said R is methyl and said R' is hydrogen.

3. A method in accordance with claim 1 wherein said compound is purified by fractional distillation.

4. A process for the preparation of a compound of the formula

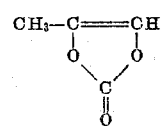

which comprises bubbling chlorine gas into an alkylene carbonate of the formula

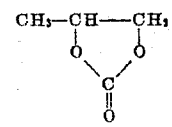

in a mol quantity ratio of said gas to said carbonate of between 0.75 and 1.25 to one and a mol rate ratio of said gas to said carbonate of between 0.1:1 and 1:1 per hour, said carbonate being illuminated with actinic light of a wave length between 2000–4000 angstroms at a temperature between about 20° and 90° C., and subsequently distilling over the resulting reaction mixture at a temperature between 100 and 300° C., and then fractionally distilling the resultant distillate and recovering the fraction distilling at 178–180° C. at 750 mm. Hg pressure absolute.

References Cited in the file of this patent

UNITED STATES PATENTS

| | | |
|---|---|---|
| 2,773,881 | Dunn | Dec. 11, 1956 |
| 2,816,287 | Ellingboe et al. | Dec. 10, 1957 |
| 2,857,434 | Patton | Oct. 21, 1958 |
| 2,873,230 | Thomas | Feb. 10, 1959 |
| 2,918,478 | Newman | Dec. 22, 1959 |

FOREIGN PATENTS

| | | |
|---|---|---|
| 1,044,104 | Germany | Nov. 20, 1958 |

OTHER REFERENCES

Newman et al.: Jour. Am. Chem. Soc., vol. 75, pp. 1263–1264 (1953).